United States Patent [19]

Yamamura et al.

[11] 4,456,868
[45] Jun. 26, 1984

[54] METHOD AND APPARATUS FOR CONTROLLING AC MOTORS

[75] Inventors: Sakae Yamamura, Komae; Shigeki Kawada, Hino, both of Japan

[73] Assignee: Fanuc Limited, Tokyo, Japan

[21] Appl. No.: 445,370

[22] PCT Filed: Mar. 30, 1982

[86] PCT No.: PCT/JP82/00086

§ 371 Date: Nov. 26, 1982

§ 102(e) Date: Nov. 26, 1982

[87] PCT Pub. No.: WO82/03508

PCT Pub. Date: Oct. 14, 1982

[30] Foreign Application Priority Data

Mar. 31, 1981 [JP] Japan .................................. 56/047933
Mar. 31, 1981 [JP] Japan ...................................... 047934
Mar. 31, 1982 [JP] Japan .................................. 56/047932

[51] Int. Cl.³ .............................................. H02P 1/26
[52] U.S. Cl. .................................... 318/800; 318/806; 318/802; 318/809
[58] Field of Search .............................. 318/798–811, 318/615–618, 603

[56] References Cited

U.S. PATENT DOCUMENTS 3,851,234 11/1974 Hoffman et al. ..................... 318/800
4,281,276 7/1981 Cutler et al. ......................... 318/810
4,292,577 9/1981 Cesarz et al. ......................... 318/807
4,310,791 1/1982 Akamatsa ............................. 318/808
4,311,951 1/1982 Walker et al. ........................ 318/778
4,327,313 4/1982 Tsuboi et al. ........................ 318/808
4,392,100 7/1983 Stanton et al. ....................... 318/808

FOREIGN PATENT DOCUMENTS

2056710 7/1980 United Kingdom .

*Primary Examiner*—Stanley J. Witkowski
*Assistant Examiner*—A. Evans
*Attorney, Agent, or Firm*—Staas & Halsey

[57] ABSTRACT

An AC motor control method and apparatus therefor, for controlling an AC motor 11 by holding the excitation current $I_0$ of the AC motor 11 constant and varying primary current $I_1$ in accordance with a speed deviation $\Delta n$. Stored previously in a memory device 18 are a torque T-slip frequency $\omega_s$ characteristic, a slip frequency $\omega_s$-primary current vector $I_1$ characteristic, and a slip frequency $\omega_s$ and phase $\phi_1$ characteristic which take secondary leakage reactance into account. Slip frequency $\omega_s$, primary current vector $I_1$ and phase $\phi_1$ are read out of the memory device in accordance with the torque command T obtained from the speed deviation $\Delta n$, whereby three-phase current commands $i_u$, $i_v$, $i_w$ are produced. Accordingly, torque irregularity is suppressed and an excellent response obtained.

8 Claims, 18 Drawing Figures

METHOD AND APPARATUS FOR CONTROLLING AC MOTORS

TECHNICAL FIELD

This invention relates to an AC motor control method and an apparatus therefor. More particularly, the invention relates to a method and apparatus for controlling AC motors wherein torque irregularity is suppressed and an excellent response obtained by executing control which take secondary leakage reactance into consideration.

BACKGROUND ART

It is well known in the art that variable frequency (VF) and variable voltage-variable frequency (VVVF) are available as control methods for converting direct current into alternating current by means of an inverter circuit to drive an induction motor through use of the alternating current. With the VF control method, a primary frequency, which is the output of the inverter circuit, is varied in accordance with a speed command. With the VVVF control method, the amplitude of the primary voltage also is varied in proportion to the change in primary frequency, with the output torque being held constant. These control methods deal with the voltage and current applied to the induction motor in terms of amplitude and frequency, but both of them are mean value control methods. It is not possible, therefore, to achieve fine control with good response. Accordingly, in order to improve upon this disadvantage, a so-called "vector control method" has recently been developed and put into practical use. According to such method, a pulse-width control method is employed to control the momentary value of the stator current of an induction motor, enabling torque generation similar to that seen in a shunt-wound DC machine. The vector control method applied to induction motors is based on the torque generating principle of a shunt-wound DC machine and controls the momentary value of a stator current to generate a torque in the same manner as said DC machine.

A brief description of the vector control method will now be set forth.

Figure 1:
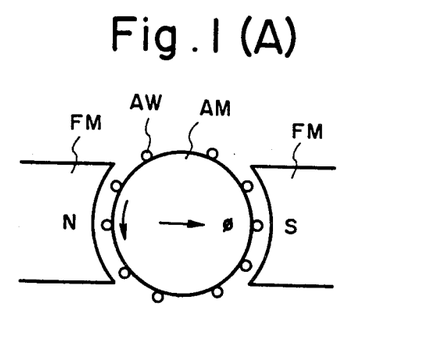
FIG. 1A and FIG. 1B is an explanatory view for describing the torque generating mechanism of a DC shunt-wound machine.

In general, the torque generating mechanism of a shunt-wound DC machine is such that a current switching operation is effected by a commutator in order that the magnetomotive force of an armature current $I_a$ will lie perpendicular to the main magnetic flux $\phi$ at all times, as shown in (A), (B) of FIG. 1. The generated torque T is expressed by the following equation, the torque $T_a$ being proportional to the armature current $I_a$ if the main magnetic flux $\phi$ is constant:

$$T_a = k \cdot I_a \cdot \phi \qquad (1)$$

In FIG. 1(A), FM denotes field poles, AM an armature, and AW the armature winding.

In order to apply the foregoing relation to an induction motor, correspondence is established between $\phi$ and the magnetic flux vector $\phi_2$ of a rotor, and between $I_a$ and a secondary current vector $\dot{I}_2$. Accordingly, to drive an induction motor in accordance with a principle resembling the generation of a torque by means of a shunt-wound DC machine, control should be effected in such a manner that the relation between the rotor flux vector $\phi_2$ and the secondary current $\dot{I}_2$ remains as shown in FIG. 1(B) at all times, that is, in such a manner that these vectors are made to cross each other perpendicularly.

Figure 2:
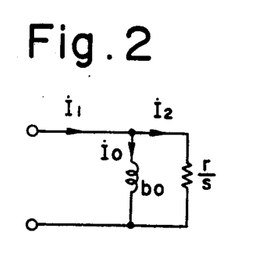
FIG. 2 is an equivalent circuit diagram illustrative of the conventional vector control method.

Thus, in accordance with vector control, the equivalent circuit of an induction motor may be considered to have the configuration shown in FIG. 2. That is, the perpendicular relation between the magnetic flux $\phi_2$ and the secondary current vector $\dot{I}_2$ is assured by neglecting secondary leakage reactance. As a result, the generated torque $T_a$, neglecting secondary leakage reactance, is expressed by:

$$T_a = k \cdot I_2 \cdot \phi_2 \approx k \cdot I_2 \cdot \phi_m \qquad (2)$$

Figure 3:
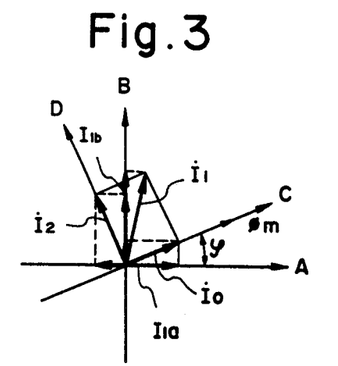
FIG. 3 is a vector diagram illustrative of the conventional vector control method.

(where $\phi_m$ is the main magnetic flux arising from an excitation current $I_o$). FIG. 3 is a vector diagram of a two-phase induction motor, in which the C-D axes represent a coordinate system which coincides with the phase of the main flux $\phi_m$, and the A-B axes represent the static coordinate system of the stator. Furthermore, $\dot{I}_1$ denotes the stator current (primary current), $\dot{I}_o$ an excitation current component, and $\dot{I}_2$ a secondary current. $I_{1a}$, $I_{1b}$ denote the A and B axis components of the stator current $\dot{I}_1$, namely the A-phase stator current and B-phase stator current, respectively.

If we assume that the main flux $\phi_m$ is rotating with respect to the static coordinate system of the stator at an angle of rotation $\phi (\phi = \omega t$ if the angular velocity is $\omega$), then the A-phase stator current $I_{1a}$ and B-phase stator current $I_{1b}$ will be expressed by the respective equations:

$$I_{1a} = I_o \cos\phi - I_2 \sin\phi \qquad (3)$$

$$I_{1b} = I_o \sin\phi + I_2 \cos\phi \qquad (4)$$

Thus, in accordance with the vector control method, the A-phase and B-phase stator current $I_{1a}$, $I_{1b}$ indicated by Eqs. (3), (4) are generated and applied to the stator windings (primary windings) to drive the induction motor. When the load changes, only the secondary current $I_2$ is increased or decreased accordingly, with the excitation current $I_o$ being held constant.

In the vector control method of the DC control type, secondary leakage reactance is ignored in order to maintain the perpendicular relation between $\phi_2$ and $\dot{I}_2$. Accordingly, a considerable error appears in the computation of the primary current $\dot{I}_1$ and the control operation becomes irregular, giving rise to a transient phenomenon and, hence, a torque irregularity. Moreover, when there is a sudden change in a speed command or torque command owing to a response time constant of a large value (on the order of 0.6), the rise characteristic deteriorates, especially at start-up, and a considerable amount of time is required to attain the commanded speed.

The object of the present invention is to provide a novel AC motor control method and apparatus therefor, wherein torque irregularity can be suppressed and an excellent response obtained.

Another object of the present invention is to provide an AC motor control method and apparatus therefor, through which the rise characteristic at start-up can be improved.

Still another object of the present invention is to provide an AC motor control method and apparatus therefor, wherein an induction motor can be utilized as a positioning servomotor.

DISCLOSURE OF THE INVENTION

In accordance with the present invention, an AC motor control method has a first step of obtaining slip frequency, phase difference and primary current amplitude using a speed command and an actual speed, and a second step of producing a three-phase current command using the slip frequency, phase difference and amplitude obtained in the first step, as well as an angular frequency dependent upon the actual speed, the AC motor being driven by said three-phase current command, characterized in that said first step includes a first computation step for deriving a torque command from a deviation between the speed signal and the actual speed, and a second computation step for deriving beforehand a torque-slip frequency relation and a slip frequency-primary current vector relation which take the secondary leakage reactance of the AC motor into consideration, finding slip frequency using the torque command obtained in the torque computation step and the torque-slip frequency relation, and then finding the primary current amplitude and phase difference using said slip frequency and the slip frequency-primary current vector relation.

Further, the present invention is characterized by a third step of passing a direct excitation current through stator windings when the AC motor is at rest. Still further, the present invention is characterized by a fourth step of finding a positional offset between a commanded position and the current position and generating a speed command corresponding to the positional offset.

Next, an AC motor control apparatus according to the present invention is characterized by including a speed sensor for sensing the actual speed of the AC motor, torque command generating means for generating a torque command on the basis of a speed deviation between a speed command and an actual speed from the speed sensor, memory means for storing beforehand a torque-slip frequency characteristic, a slip frequency-amplitude characteristic and a slip frequency-phase characteristic which take secondary leakage reactance into consideration, with a slip frequency corresponding to the torque command, as well as the primary current amplitude and phase corresponding to the slip frequency, being read out of the memory means, an arithmetic circuit for computing a three-phase current command from the read slip frequency, the read amplitude and phase of the primary current, and from an angular frequency dependent upon the actual speed, and a drive circuit for driving the AC motor by means of the three-phase current command from the arithmetic circuit.

BRIEF DESCRIPTION OF THE DRAWINGS

FIG. 12B shows characteristics associated with FIG. 11.

BEST MODE FOR CARRYING OUT THE INVENTION

An embodiment of the present invention will now be described in detail with reference to the drawings.

Figure 4:
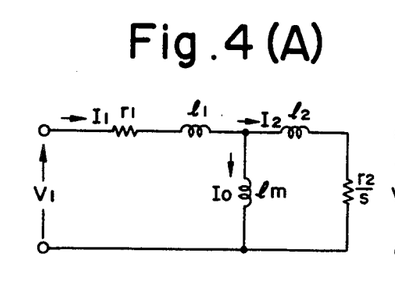
FIG. 4A and FIG. 4B is an equivalent circuit diagram illustrative of the present invention.
Figure 5A:
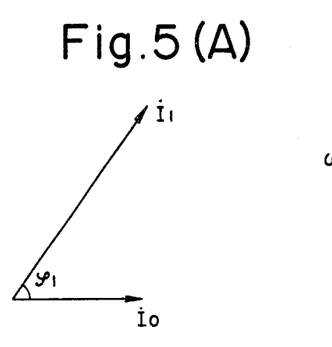
FIG. 5A and FIG. 5B is a vector diagram illustrative of the present invention.
Figure 5B:
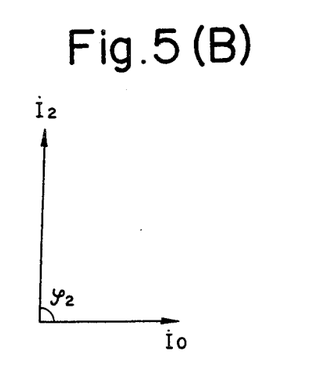
Figure 6:
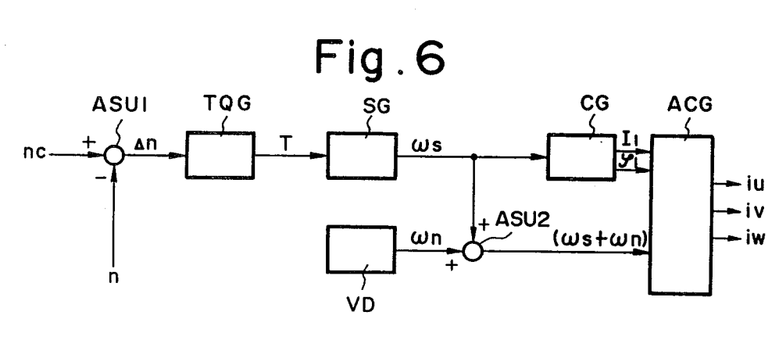
FIG. 6 is a simplified block diagram illustrating a magnetic field acceleration control method according to the present invention.

FIGS. 4 through 6 are simplified explanatory views illustrative of the AC motor control method according to the present invention. FIG. 4 is a T-type equivalent circuit in which $r_1$ denotes a primary resistor, $l_1$ a primary leakage inductance, $r_2$ a secondary resistor, $l_2$ a secondary leakage inductance, and $l_m$ an excitation inductance. Slip is indicated by S. We will assume that $x_2 = \omega l_2$, and that $x_m = \omega l_m$. Though core loss is neglected here, no practical difficulties are encountered since the resulting error is quite small. When effecting control by means of a current control-type inverter, the impedence of the current source is infinite. This allows us to neglect the primary resistance $r_1$ and primary leakage inductance $l_1$ in (A) of FIG. 4, so that the equivalent circuit of the induction motor is reduced to the form shown in (B) of FIG. 4. Thus, the present invention controls the induction motor on the basis of the equivalent circuit shown in FIG. 4(B).

From FIG. 4(B), primary current $I_1$ and secondary current $I_2$ may be written:

$$I_2 = \frac{j \cdot S \cdot x_m}{r_2 + j \cdot S \cdot x_2} I_o \tag{5}$$

$$I_1 = I_o + I_2 = I_o \left[ 1 + \frac{j \cdot S \cdot x_m}{r_2 + j \cdot S \cdot x_2} \right] \tag{6}$$

Writing vector diagrams of the primary current $I_1$ and secondary current $I_2$ on the basis of the excitation current $I_o$ gives the diagrams shown in FIGS. 5(A) and 5(B).

The torque $T_a$ generated by the induction motor can be expressed by:

$$T_a = \frac{3}{\omega} \cdot \frac{r_2}{S} \cdot I_2^2 \tag{7}$$

From Eq. (5), we obtain the effective value $|I_2|$ of the secondary current:

$$|I_2| = \frac{S \cdot x_m}{\sqrt{r_2^2 + (S \cdot x_2)^2}} I_o \tag{5'}$$

so that the generated torque $T_a$ may be written as follows based on Eqs. (5'), (7);

$$T_a = \frac{3}{\omega} \cdot \frac{r_2}{S} \cdot \frac{(S \cdot x_m)^2}{r_2^2 + (S \cdot x_2)^2} \cdot I_o^2 \qquad (8)$$

Now, considering the fact that $x_m = \omega l_m$, $x_2 = \omega l_2$, $\omega \cdot S = \omega_s$ (slip frequency), Eq. (8) can transformed into the following:

$$T = 3r_2 I_o^2 / \left[ \frac{1}{S \cdot \omega} \left( \frac{r_2}{l_m} \right)^2 + S \cdot \omega \left( \frac{l_2}{l_m} \right)^2 \right] \qquad (9)$$

$$= 3r_2 I_o^2 / \left[ \frac{k_2}{\omega \cdot S} + \frac{\omega \cdot S}{k_1} \right]$$

[where we shall let $k_2 = (r_2/l_m)^2$, $k_1 = (l_m/l_2)^2$]. Similarly, from Eq. (6), the effective value $|I_1|$ of the primary current $I_1$ may be written:

$$|I_1| = |I_o| \cdot \frac{\sqrt{r_2^2 + S^2 x_2(x_2 + x_m)]^2 + (Sr_2 x_m)^2}}{r_2^2 + (S \cdot x_2)^2} \qquad (10)$$

$$= \frac{\sqrt{1 + k_4 \omega S^2 + k_5 \omega S^4}}{1 + k_3 \omega S^2} \cdot |I_o|$$

[where we shall let $$k_3 = 2^2, \quad k_4 = \frac{1}{r_2^2} \cdot (2l_2(l_2 + l_m) + r_2^2 l_m^2)$$

and $$k_5 = \frac{l_2^2(l_2 + l_m)^2}{r_2^t}].$$

Furthermore, the phase $\phi_1$ of the primary current may be expressed as follows:

$$\tan \phi_1 = \frac{Sr_2 x_m}{r_2^2 + S^2 x_2(x_2 + x_m)} \qquad (11)$$

$$= 1 / \left[ \frac{r_2}{S \omega l_m} + S \cdot \omega \left( \frac{l_2^2}{r_2 l_m} + \frac{l_2}{r_2} \right) \right]$$

$$= 1 / \left( \frac{k_o}{\omega S} + \frac{\omega \cdot S}{k_7} \right)$$

$$\therefore \phi_1 = \tan^{-1} \frac{1}{\left( \frac{k_o}{\omega S} + \frac{\omega S}{k_7} \right)}$$

[where we shall let $$k_6 = \frac{r_2}{l_m}, \quad k_7 = \frac{r_2}{l_2} \left( \frac{l_m}{l_2 + l_m} \right)].$$

It should be noted that $k_1$ through $k_7$ is Eqs. (9) through (11) are constants provided that $I_o$ is held constant In view of Eqs. (9), (10) and (11), the slip frequency $\omega_s$ is decided by Eq. (9) if the torque T is given, and the amplitude $|I_1|$ and phase $\phi_1$ of the primary current $I_1$ may be found from Eqs. (10) and (11) if the slip frequency $\omega_s$ is given.

If we let $\omega_n$ denote the angular frequency corresponding to rotational speed, $\omega_s$ the slip angular frequency, $\phi$ the lead angle of the primary current with respect to the main flux, and $I_1$ the amplitude of the primary current, then the current commands $i_u$, $i_v$, $i_w$ of the U-, V and W-phases can be expressed by the following equations:

$$i_u = I_1 \sin(\omega_n t + \omega_s t + \phi) \qquad (12)$$

$$i_v = I_1 \sin\left( \omega_n t + \omega_s t + \phi + \frac{2\pi}{3} \right) \qquad (13)$$

$$i_w = I_1 \sin\left( \omega_n t + \omega_s t + \phi + \frac{4\pi}{3} \right) \qquad (14)$$

In accordance with the present invention, therefore, a torque T is commanded and $\omega_s$, $\phi$, $I_1$ are computed from Eqs. (9) through (11), an angular frequency $\omega_n$ corresponding to the actual rotational speed is sensed, and the three-phase primary current commands $i_u$, $i_v$, $i_w$ are generated on the basis of Eqs. (12) through (14) using $\omega_s$, $\omega_n$, $\phi$ and $I_1$. The inventive control method, which takes secondary leakage reactance into consideration, is referred to hereinafter as a magnetic field acceleration control method. Further, in the present invention, a direct excitation current is passed through the stator windings when the motor is at rest (with the proviso that the motor power supply is connected into the circuit). That is, since the slip angular frequency $\omega_s$ is zero ($\omega_s = 0$) when the motor is at rest, a primary current (direct current) decided by Eq. (6) is passed through the stator windings as an excitation current. By doing so, although a direct current flows in the stator windings, the current values of the three-phase current are each held at values of a magnitude in accordance with the phases which prevailed when the motor was stopped. As a result, a magnetic flux is generated even when the motor is at rest. Accordingly, when a speed command or torque command is applied, the motor immediately follows up the command and begins rotating, making it possible to avoid electrical transient phenomena when the motor is started so that the starting characteristic can be greatly improved.

FIG. 6 is a simplified block diagram for realizing a magnetic field acceleration control method according to the present invention. In the Figure, $ASU_1$ denotes an arithmetic unit for generating a deviation between a command speed $n_c$ and an actual speed n, namely speed error $\Delta n$. TQG represents a torque command generating unit. It should be noted that TQG is a compensating circuit the transfer function whereof is suitably set in such a manner that a speed control loop including a motor may operate in a stable fashion. SG designates a slip frequency generating unit for computing the slip frequency $\omega_s$ from Eq. (9) using the torque command T obtained. CG is an amplitude/phase generating unit for computing the amplitude $I_1$ and phase $\phi_1$ of a primary current from Eqs. (10), (11) using the slip frequency $\omega_s$. Designated at VD is a speed detector for producing an angular frequency $\omega_n$ commensurate with the actual rotational speed of an induction motor. $ASU_2$ represents an arithmetic unit for producing ($\omega_s + \omega_n$) by adding $\omega_s$ and $\omega_n$, and ACG denotes a primary current arithmetic unit for generating three-phase primary current commands $i_u$, $i_v$, $i_w$ based on Eqs. (12) through (14). It should be noted that SG, CG, ASU$_2$ and ACG can be constituted by a single microcomputer. Thus, in accordance with the magnetic field acceleration control method of the present invention, the torque command T is found from the speed error $\Delta n$, the slip frequency $\omega_s$ is computed from Eq. (9) using the torque command T, and the amplitude $I_1$ and phase $\phi_1$ of the primary current are obtained from Eqs. (10), (11) using $\omega_s$. Meanwhile, the angular frequency $\omega_n$ corresponding to the actual rotational speed is sensed. Then, using $\omega_s$, $\omega_n$, $I_1$ and $\phi_1$, the primary current commands $i_u$, $i_v$, $i_w$ are computed from Eqs. (12) through (14). Furthermore, when the motor is stopped, a direct current decided by Eq. (10) is passed through the stator windings.

Figure 7:
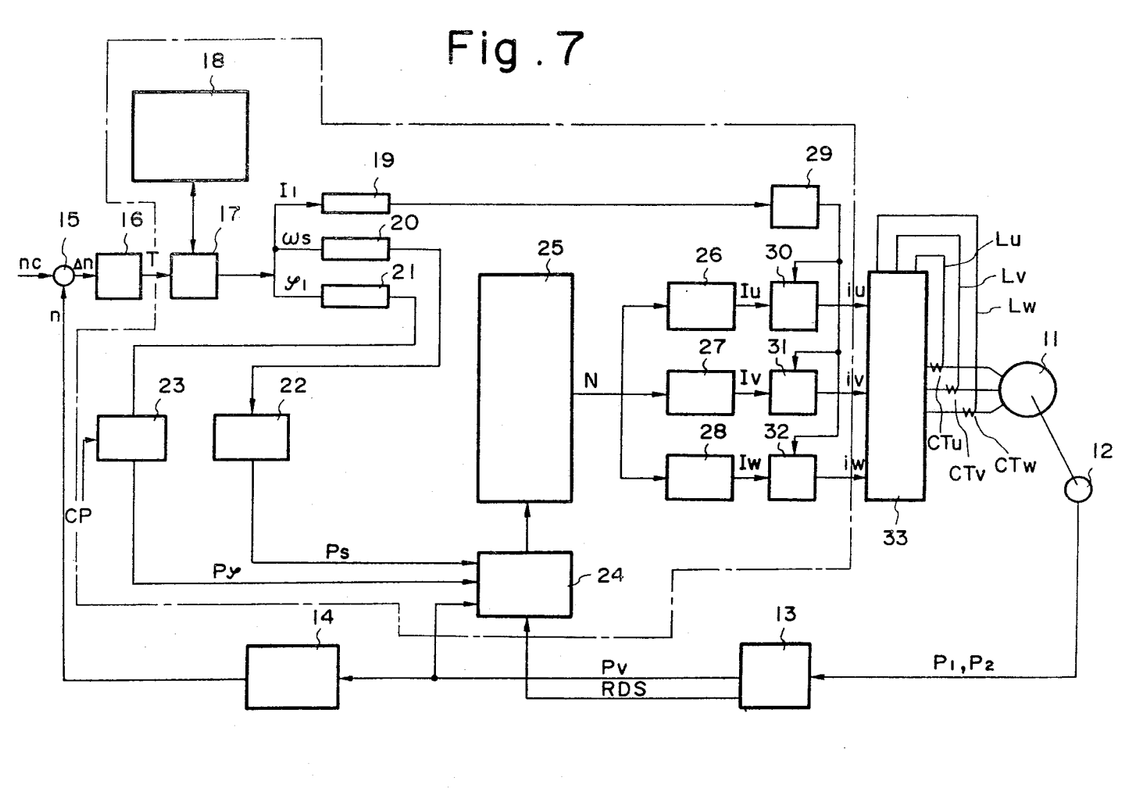
FIG. 7 is a detailed circuit block diagram illustrative of the magnetic field acceleration control method according to the present invention.
Figure 8A:
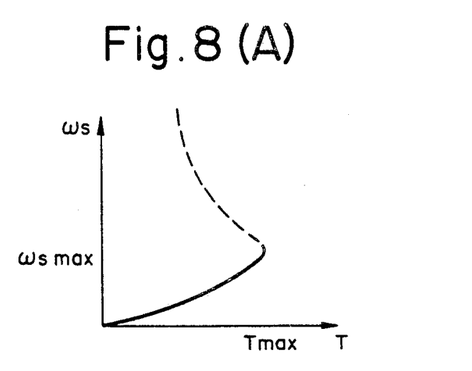
FIG. 8A, FIGS. 8B and 8C is a graph showing a $T - \omega_s$ characteristic, a $\omega_s - I_1$ characteristic and a $\omega_s - \phi_1$ characteristic according to the present invention.
Figure 8B:
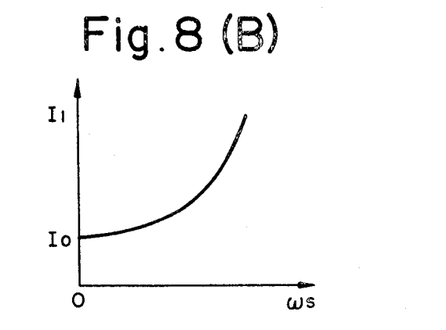
Figure 8C:
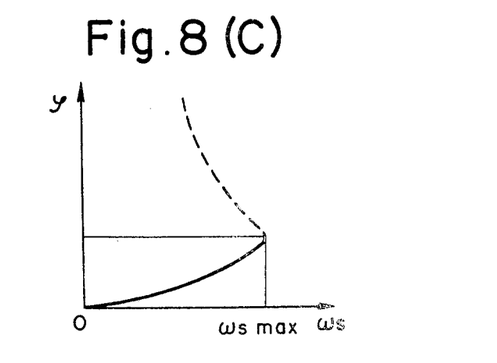

FIG. 7 is a detailed circuit block diagram for realizing the magnetic field acceleration control method according to the present invention.

Figure 9:
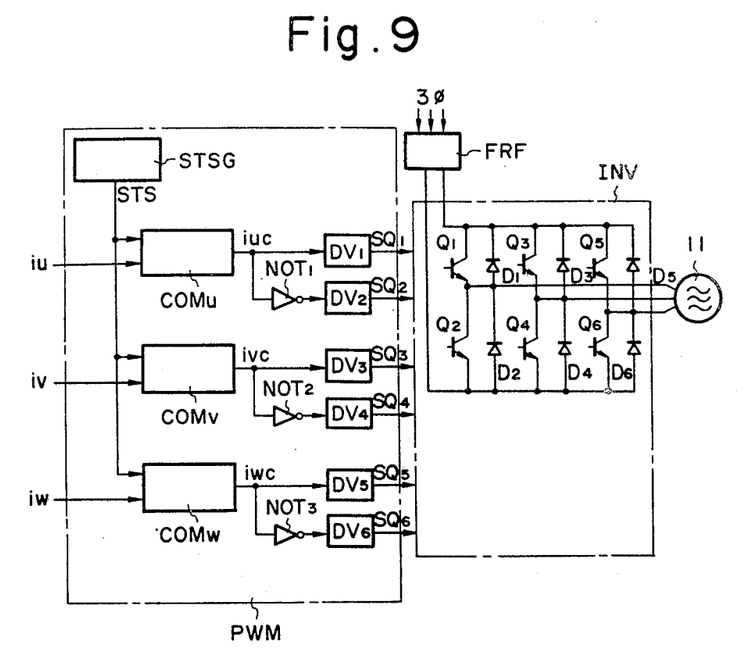
FIG. 9 is a circuit diagram of a drive circuit for an induction motor in FIG. 7.
Figure 10:
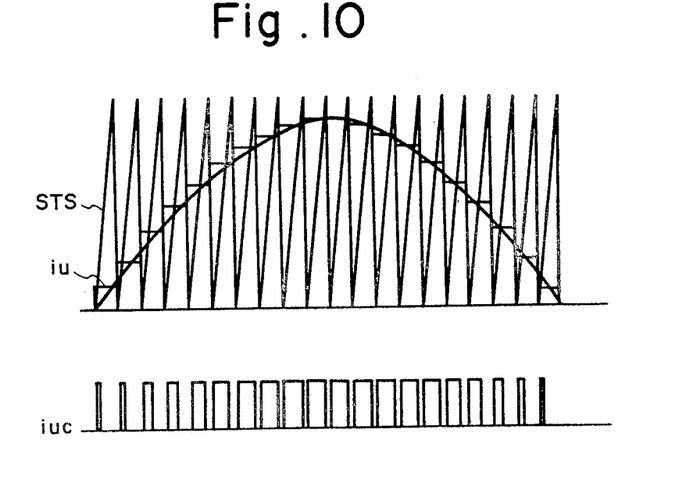
FIG. 10 is an explanatory diagram for describing the generation of a primary current command $i_{uc}$ in FIG. 9.

In the Figure, numeral 11 denotes a three-phase induction motor, and 12 a pulse generator such as a rotary encoder for generating first and second pulse trains P1, P2 displaced in phase from each other by $\pi/2$, each pulse train having a frequency $f_n$ that is proportional to the rotational speed. Although a resolver can be used as the pulse generator 12, in this case a pulse producing circuit is necessary, whereas the output waveform of a resolver is a sine wave. Numeral 13 denotes a quadrupling circuit which differentiates the first and second pulses P1, P2 generated by the pulse generator 12 to generate a pulse train Pv the frequency Fn (angular frequency $\omega_n$) whereof is four times the frequency $f_n$. The quadrupling circuit 13 also produces a rotational direction signal RDS upon discriminating the phase difference between the first and second pulses. Numeral 14 designates a frequency-voltage converter (FV converter) for producing a voltage proportional to the actual rotational speed n. Numeral 15 denotes an arithmetic unit for producing a deviation between the commanded speed $n_c$ and the actual rotational speed n, 16 an error amplifier for producing the torque command T, and 17 a read control circuit for reading and delivering, from a memory device described later, slip frequency $\omega_s$, amplitude $I_1$ and phase $\phi_1$ found from a torque-slip frequency characteristic ($T-\omega_s$ characteristic), slip frequency-amplitude characteristic ($\omega_s-I_1$ characteristic) and slip frequency-phase characteristic ($\omega_s-\phi_1$ characteristic) that are stored in the memory device. Numeral 18 denotes the memory device, which stores corresponding relationships, namely the $T-\omega_s$ characteristic, $\omega_s-I_1$ characteristic and $\omega_s-\phi_1$ characteristic in the form of a table. More specifically, the corresponding relationships $T-\omega_s$, $\omega_s-I_1$ and $\omega_s-\phi_1$ are derived from Eqs. (9), (10) and (11) and stored as a table. Note that the $T-\omega_s$ characteristic, $\omega_s-I_1$ characteristic and $\omega_s-\phi_1$ characteristic are as shown in (A), (B) and (C) of FIG. 8, respectively. Numerals 19, 20, 21 denote registers for storing the amplitude $I_1$, slip frequency $\omega_s$ and phase $\omega_1$, respectively. Designated at 22 is a pulse generator for generating a pulse train Ps the frequency whereof is proportional to the slip frequency $\omega_s$, a digital quantity. Numeral 23 represents a presettable counter circuit in which the phase $\phi$ is set, for producing a pulse train P$\phi$ of a frequency corresponding to the phase $\phi_1$. Numeral 24 denotes a synthesizing circuit for combining the pulse Pv, of an angular frequency $\omega_n$, obtained from the quadrupling circuit 13, the pulse train Ps, of a slip angular frequency $\omega_s$, obtained from the pulse generator 22, and the pulse train P$\phi$ the frequency whereof corresponds to the phase $\phi$. Designated at 25 is an up/down counter for reversibly counting the output pulses of the synthesizing circuit 24 in accordance with the sign thereof. The content of the up/down counter 25 is a numerical value N corresponding to $(\omega_n t + \omega_s t + \frac{\phi}{8})$. Numerals 26, 27, 28 denote decoders. Decoder 26 includes a correspondence table between N and sin N, the decoder 27 a correspondence table N and sin $(N+2\pi/3)$, and the decoder 28 a correspondence table between N and sin $(N+4\pi/3)$, the decoders receiving the numerical value N at a rapid rate and sequentially producing $U-$, $V-$ and $W-$ phase current command values (digital values) $I_u$, $I_v$, $I_w$ conforming to the numerical value N, respectively. Reference numerals 29 through 32 denote digital-analog converters (DA converters). The DA converter 29 receives as an input the amplitude $I_1$ (digital value) from the register 19 and generates an analog voltage proportional to $I_1$. The DA converters 30 through 32 receive as respective inputs the three-phase current command values $I_u$, $I_v$, $I_w$ from the decoders 26 through 28, and each receives the amplitude signal from the DA converter 29 also as an input. These converters perform multiplication to produce the three-phase analog current commands $i_u$, $i_v$, $i_w$ given by Eqs. (12) through (14). Numeral 33 denotes an induction motor drive circuit having a pulse width modulator PWM, inverter INV and three-phase full-wave rectifier FRF, as shown in FIG. 9. The pulse width modulator PWM comprises a sawtooth generating circuit for generating a sawtooth waveform STS, comparators COMU, COMV, COMW, NOT gates NOT$_1$ through NOT$_3$, and drivers DV$_1$ through DV$_6$. The inverter INV includes six power transistors Q1 through Q6 and six diodes D1 through D6. The comparators COMU, COMV, COMW of the pulse width modulator PWM compare the sawtooth signal STS with the amplitudes of the three-phase alternating current signals $i_u$, $i_v$, $i_w$, respectively, and produce a "1" output when the magnitude of STS is exceeded by $i_u$, $i_v$ or $i_w$, or a "0" output when the magnitude of STS is greater. Thus, with respect to $i_u$, the comparator COMU produces the current command $i_{uc}$ shown in FIG. 10. More specifically, pulse-width modulated three-phase current commands $i_{uc}$, $i_{vc}$, $i_{wc}$ dependent upon the amplitudes of $i_u$, $i_v$, $i_w$ are delivered as inverter drive signals SQ1 through SQ6 via NOT gates NOT$_1$ through NOT$_3$ and drivers DV$_1$ through DV$_6$, and are applied as input signals to the inverter INV. The inverter drive signals SQ1 through SQ6 input to the inverter INV are applied to the bases of the power transistors Q1 through Q6, respectively, thereby controlling the on/off action of the power transistors to supply the induction motor 11 with a three-phase current. CTu, CTv, CTw denote current transformers for sensing current. The lines Lu, Lv, Lw (FIG. 7) are feedback lines for current minor loops.

The operation of the present invention will now be described.

When speed command means, not shown, issues a speed command $n_c$, the three-phase induction motor 11 attempts to rotate the the speed $n_c$. As the motor rotates, the pulse generator 12 generates the first and second pulse trains displaced in phase by $\pi/2$ and having a frequency proportional to the rotational speed n of the motor 11. The quadrupling circuit 13 multiplies the pulse trains P1, P2 by four to produce the pulse train Pv the frequency whereof is the angular frequency $\omega_n$, and also generates the rotational direction signal RDS. The pulse train Pv enters the synthesizing circuit 24 as well as the FV converter 14, where it is converted into a voltage corresponding to the rotational speed. The arithmetic unit 15 computes the difference betwen $n_c$ and n, and the operational (sic.) amplifier 16 produces the torque command T by amplifying the speed error $\Delta n$. Upon receiving the torque command T, the read control circuit 17 reads, from the memory device 18, the slip frequency $\omega_s$ corresponding to the torque, as well as the amplitude $I_1$ and phase $\phi_1$ corresponding to $\omega_s$. These are set in the registers 19 through 21. As a result, the pulse generator 22 generates the pulse train Ps having the slip frequency $\omega_s$, and the counter circuit 23 delivers the pulse train P$\phi$ which conforms to the phase difference $\phi$. These pulse trains are combined, by the synthesizing circuit 24, with the pulse train Pv having the angular frequency $\omega$n. The pulse train synthesized by the synthesizing circuit 24 enters the up/down counter 25 were it is counted up or down depending upon the sign of the pulse train. Since the content of the up/down counter 25 is the numerical value N conforming to ($\omega_n t + \omega_s t + \phi$), the decoders 26 through 28 receive the numerical value N and, using the internal tables N−sin N, N−sin (N+2$\pi$/3) and N−sin (N+4$\pi$/3), produce the U−, V− and W− phase current commands $I_u$, $I_v$, $I_w$ which are applied to the DA converters 30 through 32, respectively. As a result, the DA converters 30 through 32, using the amplitude signal $I_1$ output by the DA converter 29 and the current commands $I_u$, $I_v$, $I_w$, generate the three-phase analog current commands $i_u$, $i_v$, $i_w$ given by Eqs. (12) through (14) and apply these to the comparators COMU, COMV, COMW. The comparators COMU, COMV, COMW compare the amplitudes of the three-phase AC signals $i_u$, $i_v$, $i_w$ with the amplitude of the sawtooth STS, and deliver as outputs three-phase current commands $i_{uc}$, $i_{vc}$, $i_{wc}$ produced by way of pulse width modulation. The outputs from the comparators are supplied to the NOT gates NOT$_1$ through NOT$_3$ and to the drivers DV$_1$ through DV$_6$, which generate the inverter drive signals SQ1 through SQ6. The inverter drive signals SQ1 through SQ6 are applied to the bases of the power transistors Q1 through Q6, respectively, in the inverter INV to turn the power transistors Q1 through Q6 on and off for supplying the three-phase current to the three-phase induction motor 11. The induction motor will subsequently be controlled in a similar mode until the motor 11 eventually rotates at the commanded speed.

The foregoing relates to a case where individual items of hardware are employed for construction. It is permissible, however, to construct the blocks from the read control circuit 17 to the decoder 28 using a microprocessor, by way of example.

In accordance with the induction motor control method of the present invention, the primary current can be computed accurately because secondary reactance is not neglected. As a result, the excitation current $I_o$ is held constant automatically and transient phenomena do not arise. Furthermore, control can be effected at almost zero response time by virtue of combining the high-speed processing capability of a microcomputer with the excellent response of a pulse width modulating-type inverter. In particular, since an excitation current (direct current) flows into the stator windings even when the motor is stopped, the starting characteristic can be vastly improved.

Figure 11:
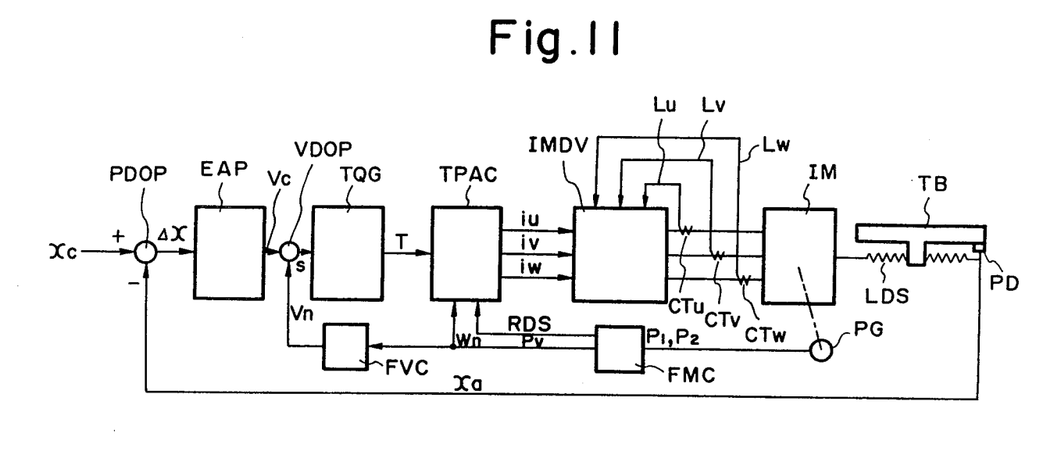
FIG. 11 is a block diagram for servo control in a case where an induction motor is used as a servomotor in one example of applying the present invention; and FIG. 12A

FIG. 11 is an exemplary block diagram of a servo circuit using the induction motor control system of the invention, for a case where an induction motor is employed as a servomotor for positioning the movable element of a machine tool.

Figures 12A, 12B:
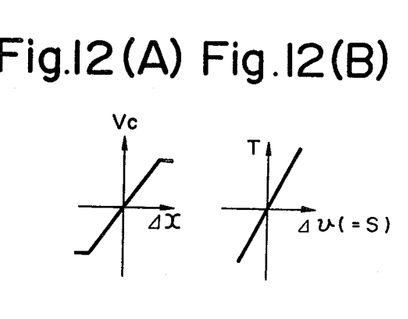

In the Figure, PDOP denotes an arithmetic circuit represents an arithmetic unit for computing and delivering a positional offset $\Delta x$ between a commanded position $x_c$ and the current positon $x_a$, EAP a operational amplifier having the characteristic shown in FIG. 12(a) for multiplying the positional offset $\Delta x$ to produce a speed command $V_c$, VDOP an arithmetic circuit for computing a speed deviation $\Delta v$ between the speed command $V_c$ and the actual speed $V_n$, TQG an operational amplifier having the characteristic shown in FIG. 12(b) for generating a torque T, and TPAC a primary current command generating unit for generating the three-phase primary current commands $i_u$, $i_v$, $i_w$. A microcomputer can be used to construct these elements, inclusive of the portion surrounded by the one-dot chain line in FIG. 7. IMDV represents an induction motor drive circuit, having the same construction and function and the induction motor drive circuit 33 shown in FIG. 7. Lu through Lv denote current feedback lines, CTu through CTv designate current transformers for sensing current, and IM denotes an induction motor. Further, PG denotes a pulse generator for generating a pulse train of a frequency dependent upon the rotational speed of the induction motor. FMC designates a quadrupling circuit and FVC an FV converter. These have the same construction and function as the pulse generator 12, quadrupling circuit 13 and FV converter 14 of FIG. 7. LDS represents a lead screw driven rotatively by the induction motor. TB is a table, and PD a position detector for generating the current position $x_a$ of the table.

The operation of FIG. 11 will now be described.

Applying a position command $x_c$ gives rise to a positional deviation which causes the induction motor IM to rotate in the commanded direction and transport the table. As the motor IM rotates, the pulse generator PG generates the pulse trains P1, P2 of a frequency corresponding to the actual rotational speed. The position detector PD produces the present position $x_a$. The arithmetic circuit PDOP computes the positional offset ($=x_c-x_a$), and the operational amplifier EAP converts the positional offset $\Delta x$ into a speed command $V_c$. Next, the arithmetic circuit VDOP computes the speed deviation $\Delta v$ ($=V_c-V_n$), which is converted into a torque command T by the operational amplifier TQG. Then, as described with reference to FIG. 7, the primary current command generating unit TPAC generates the primary current commands $i_u$, $i_v$, $i_w$ on the basis of the torque command T, the primary current of the induction motor being controlled by these current commands through the intermediary of the induction motor drive circuit IMDV.

From this point onward, control of the induction motor is continued in such a manner that the positional offset $\Delta x$ approaches zero, with the table TB eventually being positioned at the commanded position.

INDUSTRIAL APPLICABLITY

In accordance with the present invention, primary current can be computed correctly because secondary leakage reactance is not ignored. The result is that the excitation current $I_o$ is held constant in automatic fashion so that the flux density is held fixed. Since only the momentarily variable entities, $\phi$, and $\omega$ are controlled, transient phenomena do not occur. Furthermore, because it is possible to achieve high-speed processing by means of a microcomputer as well as the good response offered by the pulse width modulating-type inverter, primary current control can be performed rapidly and the response characteristic greatly improved. Electrical transient phenomena owing to a large time constant can be avoided, enabling torque irregularities to be suppressed. Moreover, according to the invention, an excitation current (direct current) is fed into the stator windings when the motor is stopped, thereby improving the starting characteristic so that the commanded speed can be reached in a short period of time. In addition, the induction motor can be employed as a servomotor, virtually eliminating the need for maintenance and greatly broadening the scope of induction motor application.

What is claimed is:

1. An AC motor control method comprising the steps of:
   (a) a step of obtaining slip frequency, phase difference and primary current amplitude using a speed command and an actual speed;
   (b) a step of determining angular frequency in accordance with the actual speed of the AC motor;
   (c) a step of producing a three-phase current command having a frequency by using the slip frequency, phase difference and primary current amplitude obtained in step (a), as well as said angular frequency; and
   (d) a step of driving the AC motor by said three-phase current command, wherein step (a) includes
      i computing a torque command from a deviation between said speed command signal and actual speed, where a torque-slip frequency relation and a slip frequency-primary current vector relation which take the secondary leakage reactance of said AC motor into account are predetermined;
      ii finding said slip frequency using the torque command obtained in step (i) and the torque-slip frequency relation; and then
      iii finding said primary current amplitude and phase difference using said slip frequency and slip frequency-primary current vector relation.

2. An AC motor control method according to claim 1, further including a step of obtaining the frequency of the primary current by adding the slip frequency obtained in step (a), and the angular frequency.

3. An AC motor control method according to claim 1, further including a step of passing a direct excitation current through stator windings when the AC motor is at rest.

4. An AC motor control method according claim 1, characterized in step (iii) includes finding a primary current for a slip frequency of zero from said slip frequency-primary current vector relation and employing this primary current as an excitation current passed through the stator windings when the motor is at rest.

5. An AC motor control method according to claim 1, including a step of finding a positional offset between a commanded position and a current position and generating said speed command corresponding to said positional offset.

6. An AC motor control apparatus including:
   a speed sensor for sensing the actual speed of the AC motor;
   angular frequency detection means for providing an angular frequency signal in accordance with the actual speed of the AC motor;
   torque command generating means for generating a torque command on the basis of a speed deviation between a speed command and an actual speed from said speed sensor;
   memory means for storing a torque-slip frequency characteristic, a slip frequency-amplitude characteristic and a slip frequency-phase characteristic which take secondary leakage reactance into account, for providing a slip frequency in accordance with said torque command and said torque-slip frequency characteristic, for providing a primary current amplitude in accordance with said slip frequency and said slip frequency-amplitude characteristic, and for providing a phase signal in accordance with said slip frequency and said slip frequency-phase charcteristic;
   an arithmetic circuit for computing a three-phase current command from said slip frequency, said primary current amplitude, said phase signal, and from said angular frequency signal; and
   a drive circuit for driving the AC motor by means of the three-phase current command from said arithmetic circuit.

7. An AC motor control apparatus according to claim 6, further including a position detector for detecting the current position of a movable element driven by the AC motor, and speed command generating means for obtaining an offset between said detected curent position and a commanded position and for generating a speed command in accordance with said offset.

8. A method for controlling an AC motor in accordance with a slip frequency, a phase difference, a primary current amplitude, a commanded speed and an actual speed, said method comprising the steps of:
   (a) computing a torque command in accordance with the difference between said commanded speed and said actual speed;
   (b) computing the slip frequency in accordance with the torque command, and the following relation $$T = 3r_2 I_0^2 / \left[ \frac{k_2}{\omega_s} + \frac{\omega_s}{k_1} \right]$$

wherein T corresponds to said torque command, and $$k_2 = \left( \frac{r_2}{l_m} \right)^2, k_1 = \left( \frac{l_m}{l_2} \right)^2$$

where $r_2$ is the secondary resistance, $l_m$ is the excitation inductance, $l_2$ is the secondary leakage inductance, $w_s$ is the slip frequency and $I_0$ is the excitation current;

(c) computing the primary current amplitude using said slip frequency and the following equation $$I_1 = \sqrt{\frac{1 + k_4 \omega_s^2 + k_5 \omega_s^4}{1 + k_3 \omega_s^2}} \cdot I_o$$

wherein $k_3 l_2^2$, $k_4 = 1/r_2^2 \cdot 2l_2(l_2 + l_m) + r_2^2 l_m^2)$, and $$k_5 = \frac{l_2{}^2 (l_2 + l_m)^2}{r_2{}^4};$$

(d) computing a phase difference using said slip frequency and the following relation $$\text{phase difference} = \tan^{-1} \frac{1}{\left(\frac{K_6}{\omega_s} + \frac{\omega_s}{K_7}\right)}$$

where $k_6 = \frac{r_2}{l_m}$, $k_7 = \frac{r_2}{l_2}\left(\frac{l_m}{l_2 + l_m}\right)$;

(e) determining an angular frequency in accordance with the actual speed of AC motor;
(f) generating a three-phase primary current command using the slip frequency, the phase difference, the primary current amplitude and the angular frequency; and
(g) driving the AC motor in accordance with said three-phase primary current command.

* * * * *

UNITED STATES PATENT AND TRADEMARK OFFICE
CERTIFICATE OF CORRECTION

PATENT NO. : 4,456,868  Page 1 of 3
DATED : June 26, 1984
INVENTOR(S) : Yamamura et al.

It is certified that error appears in the above-identified patent and that said Letters Patent is hereby corrected as shown below:

Front Page, [30] Foreign Application Priority Data,
    "047934" should be --56/047934--;
    "Mar. 31, 1982" should be --Mar. 31, 1981--.
Column 2, line 27, "$\phi(\phi$" should be --$\underline{\phi}(\phi$--;
    line 27, "w)" should be --$\overline{\underline{w})}$--;
    line 33, [formula (3)] "$\phi$" (both occurrences) should be --$\underline{\phi}$--;
    line 34, [formula (4)] "$\phi$" (both occurrences) should be --$\underline{\phi}$--.
Column 5, line 22, [formula (10)] "$r_2 2$" (first occurrence) should be --$[r_2 2$--.

Column 11, line 1, after "entities" insert --$/I_1/$--.
Column 12, line 67, "$K_3 1_2^2$" should be --$K_3 = 1_2^2$--.

UNITED STATES PATENT AND TRADEMARK OFFICE
CERTIFICATE OF CORRECTION

PATENT NO. : 4,456,868
DATED : June 26, 1984
INVENTOR(S) : Yamamura et al.

It is certified that error appears in the above-identified patent and that said Letters Patent is hereby corrected as shown below:

Col. 2, line 28, "$\phi$" (both occurrences) should be --$\varphi$--;
   equation (3) "$\phi$" (both occurrences) should be --$\varphi$--;
   equation (4) "$\phi$" (both occurrences) should be --$\varphi$--.

Col. 5, equation (11) "$\phi$" should be --$\varphi$--;
   line 55, "$\phi$" should be --$\varphi$--.

Col. 6, line 5, "$\phi$" should be --$\varphi$--;
   equation (12), "$\phi$" should be --$\varphi$--;
   equation (13), "$\phi$" should be --$\varphi$--;
   equation (14), "$\phi$" should be --$\varphi$--;
   line 21, "$\phi$" should be --$\varphi$--;
   line 27, "$\phi$" should be --$\varphi$--;
   line 63, "$\phi$" should be --$\varphi$--.

Col. 7, line 9, "$\phi$" should be --$\varphi$--;
   line 12, "$\phi$" should be --$\varphi$--;
   line 44, "$\phi$" should be --$\varphi$--;
   line 47, "$\phi$" should be --$\varphi$--;
   line 51, "$\phi$" should be --$\varphi$--;
   line 53, "$\phi$" should be --$\varphi$--;
   line 56, "$\phi$" should be --$\varphi$--;
   line 59, "$\phi$" should be --$\varphi$--;
   line 64, "$\phi$" should be --$\varphi$--;
   line 65, "$\phi$" should be --$\varphi$--.

Col. 8, line 1, "$\phi$" should be --$\varphi$--;
   line 2, "$\phi$" should be --$\varphi$--;
   line 7, "$5/8$" should be --$\varphi$--.

UNITED STATES PATENT AND TRADEMARK OFFICE
CERTIFICATE OF CORRECTION

PATENT NO. : 4,456,868

DATED : June 26, 1984

INVENTOR(S) : Yamamura et al.

Page 3 of 3

It is certified that error appears in the above-identified patent and that said Letters Patent is hereby corrected as shown below:

Col. 9, line 11, " $\phi$ " should be -- $\varphi$ --;
line 15, " $\phi$ " should be -- $\varphi$ --;
line 16, " $\phi$ " should be -- $\varphi$ --;
line 23, " $\phi$ " should be -- $\varphi$ --.

Signed and Sealed this

Fifth Day of November 1985

[SEAL]

Attest:

DONALD J. QUIGG

Attesting Officer

Commissioner of Patents and Trademarks